U. BALDWIN, I. T. & W. K. SHUMARD.
SEEDER AND PLANTER.
No. 195,742. Patented Oct. 2, 1877.
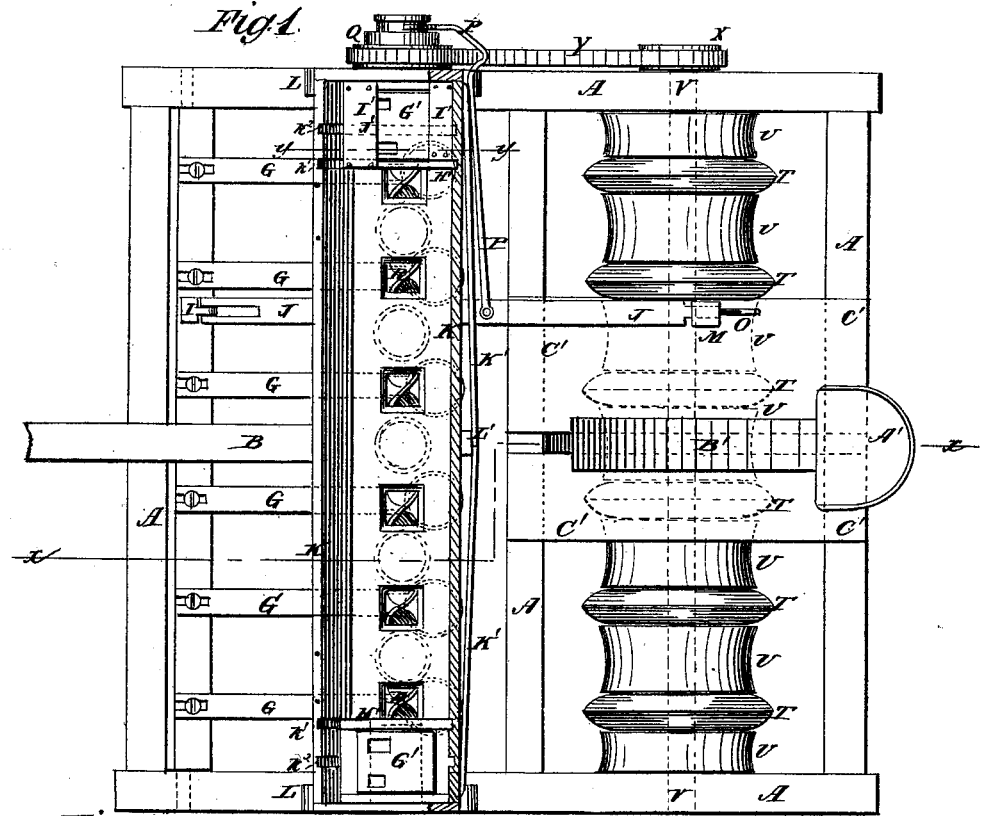
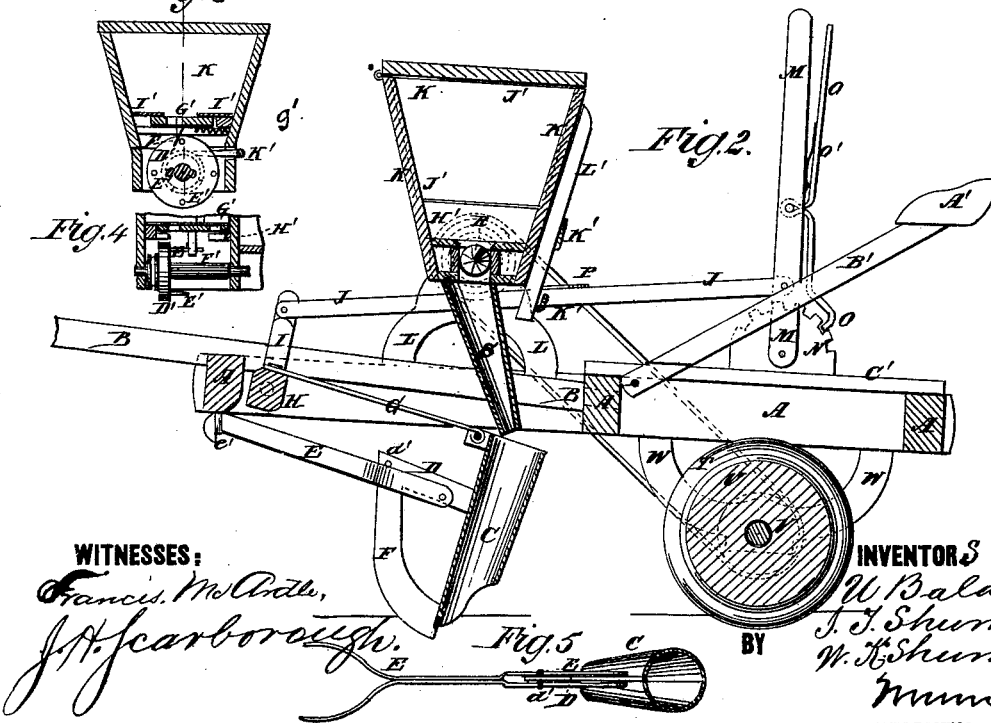

UNITED STATES PATENT OFFICE.

URIAH BALDWIN, ISAAC T. SHUMARD, AND WILLIAM K. SHUMARD, OF STEWARTSON, ILLINOIS.

IMPROVEMENT IN SEEDER AND PLANTER.

Specification forming part of Letters Patent No. 195,742, dated October 2, 1877; application filed June 18, 1877.

*To all whom it may concern:*

Be it known that we, URIAH BALDWIN, ISAAC TURNER SHUMARD, and WILLIAM KARR SHUMARD, of Stewartson, county of Shelby, and State of Illinois, have invented a new and useful Improvement in Seeder and Planter, of which the following is a specification:

Figure 1 is a top view of our improved machine. Fig. 2 is a vertical section of the same, taken through the line $x\,x$, Fig. 1. Fig. 3 is a detail cross-section of the planting-hoppers, taken through the line $y\,y$, Fig. 1. Fig. 4 is a detail longitudinal section of the same. Fig. 5 is a detail horizontal section of one of the opening-plows.

Similar letters of reference indicate corresponding parts.

The object of this invention is to furnish an improved machine which shall be so constructed that it may be readily adjusted to plant the seed in drills or rows, as may be desired, and which shall be simple in construction, convenient in use, and effective in operation.

The invention will first be described in connection with the drawings, and then pointed out in the claims.

In the drawing, A is the frame of the machine, to the middle forward part of which is secured the tongue B, to which the draft is applied.

C are the plows by which the furrows are opened to receive the seed, and which are made hollow to serve also as spouts to conduct the seed to the ground.

To the upper part of the hollow standards C are rigidly attached forwardly-projecting arms D, to the inner parts of which are pivoted the slotted rear ends of the draw-bars E. Through the upper corners of the forward ends of the arms D are passed cross-pins $d'$, which rest upon the upper side of the draw-bars E. The forward ends of the draw-bars E pass through staples or other keepers $e'$, attached to the front cross-bar of the frame A, and have shoulders or hooks formed upon them to rest against the said staples or keepers to sustain the draft-strain.

F are colters, the upper ends of which are attached to the forward ends of the arms D. The lower parts of the colters F are curved to the rearward, and their ends are attached to the lower ends of the plows C. The colters F open a way for the plows C, and should they strike an obstruction they cause the plows to rise and pass over it without breakage.

The plows C are held down to their work by the springs G, the rear ends of which are pivoted to the forward sides of the upper ends of the plows C. The forward ends of the springs G are slotted to receive the bolts that secure them to the roller H, so that they may be adjusted to give the desired pitch to the plows. The ends of the roller H are pivoted to the forward parts of the side bars of the frame A.

To the roller H is attached an upwardly-projecting arm, I, to the upper end of which is pivoted the forward end of a connecting-rod, J. The connecting-rod J passes back beneath the hopper K, the ends of which are secured to brackets L, attached to the side bars of the frame A. The rear end of the connecting-rod J is pivoted to the lever M, the lower end of which is slotted to receive the semicircular plate N, and is pivoted to said plate. The curved upper edge of the plate N is notched to receive the engaging end of the lever-pawl O, which is pivoted to the lever M, and is held in position to engage with the notches of the plate N by a spring, $o'$, interposed between its upper part and the said lever M.

By this construction, by adjusting the lever M, the roller H will be turned to adjust the plows C to work at any desired depth in the ground, or to raise said plows from or lower them to the ground.

To the connecting-rod J, a little in the rear of the hopper K, is pivoted the end of a lever, P, which is pivoted to the bracket L, and its outer end is bent forward and is forked to ride in a ring-groove formed around the outer end of the hub of the cone-pulley Q.

By this construction, by operating the lever M to raise the plows C from the ground, the cone-pulley Q will be withdrawn from its clutch-pin, so that it may revolve without revolving the shaft upon which it is placed, and when the lever M is operated to lower the plows to the ground the lever P will move the cone-pulley Q again into gear with its clutch-pin.

The cone-pulley Q is placed upon the projecting end of one of the journals of the endless screw R, which journals revolve in bearings in the ends of the hopper.

The screw R is placed in the space between the two bottoms of the hopper K, and moves the seed as it is received through the holes in the upper bottom to the holes in the lower bottom, through which it drops into the spouts S, attached to said lower bottom. The spouts S conduct the seed into the hollow standards of the plows C, through which it passes to the bottom of the furrows opened by the said plows C, where it is covered by the falling in of the soil. The soil is pressed down upon the seed by the wheels T, whose rims are made V-shaped, and the ridges formed by the plows C between the drills will be rounded up by the concaved wheels U, placed between the wheels T. The wheels T U are placed upon the shaft V, the journals of which revolve in bearings in brackets W, attached to the lower side of the rear part of the side bars of the frame A. One of the journals of the shaft V projects, and to it is attached a pulley, X, around which passes the belt or chain Y, that passes around the cone-pulley Q and drives the feed-screw R.

A' is the driver's seat, which is attached to the upper end of the inclined standard B'. The lower end of the standard B' has a tenon with inclined shoulders formed upon it, which passes through a slot in the platform C', attached to the frame A, and is secured in place by a pin passed through it beneath said platform. This construction enables the driver to adjust his seat so that he can balance the machine with his weight.

Upon the end parts of the shaft of the swiveled screw R are placed small wheels D', which are connected with said shaft by tongues and grooves, so that they may be slid in and out, as may be desired. To the side of the wheels D' are attached pins E', of different lengths, so that one or more of said pins, as the said wheels D are revolved, may strike the arm F', attached to the dropping-slide G', so that the hills may be planted farther apart or closer together by adjusting the position of the wheels D' upon the shaft of the screw R. The dropping-slides G' are drawn back by springs $g'$, attached to them, and to the hopper K, and work upon cleats attached to the ends of the hopper K and to the partitions H', that separate the wheels D' from the rest of the hopper. The ends of the dropping-slides G' work beneath narrow plates I', attached to the partitions H' and the ends of the hopper K, and extending along the sides of said hopper.

J' are partitions which, when the machine is used for drilling grain, are placed in the grooves $k^1$, formed in the sides of the hopper K, so as to be directly over the partitions H', and thus keep the grain entirely away from the dropping-slides G'.

In the dropping-slides G' are formed two holes, the smaller one for dropping seed and the larger one for dropping a fertilizer.

When the machine is used for planting, the partitions J' are inserted in the grooves $k^2$ in the sides of the hopper K, so as to be between the holes in the dropping-slides G'. When a fertilizer is to be dropped with the seed, a false bottom is put in the main part of the hopper K, upon a level with or a little above the upper edges of the partitions H'.

Around the end of the hubs of the wheels D' are formed ring-grooves, to receive the forked ends of the rods K', which pass out through slots in the rear side of the hopper K, are bent inward, and are pivoted to the lever L', upon the opposite sides of, and equally distant from, its pivot, so that by operating the lever L', which is pivoted to the rear side of the hopper K, both of the wheels D' may be operated at the same time and to the same extent.

Having thus fully described our invention, we claim as new and desire to secure by Letters Patent—

1. The roller H, connected with upper front end of plow C by springs G, in combination with rods E, pivoted below the springs to plows, and having hook ends that pass through rigid eyes $e'$, as and for the purpose specified.

2. The combination of the series of wheels T, made with V-shaped rims, and the wheels or rollers U, made with concave faces, with the shaft V, the frame A, and the plows C, substantially as herein shown and described.

3. The wheel D', having pins E' of unequal length attached to its side, and the arm F', and the spring $g'$, attached to the dropping-slide G', in combination with the shaft of the swiveled feed-screw R, the hopper K, and the dropping-slide G', substantially as herein shown and described.

4. The combination of the curved colters F with the plows C and the arms D attached to said plows, substantially as herein shown and described.

URIAH BALDWIN.
ISAAC T. SHUMARD.
WILLIAM K. SHUMARD.

Witnesses:
ALBERT G. WHITACRE,
CHARLES F. MUCHOW.